L. C. VANDERLIP.
VEHICLE STEERING MECHANISM.
APPLICATION FILED MAY 24, 1920. RENEWED APR. 21, 1921.
1,396,078.
Patented Nov. 8, 1921.
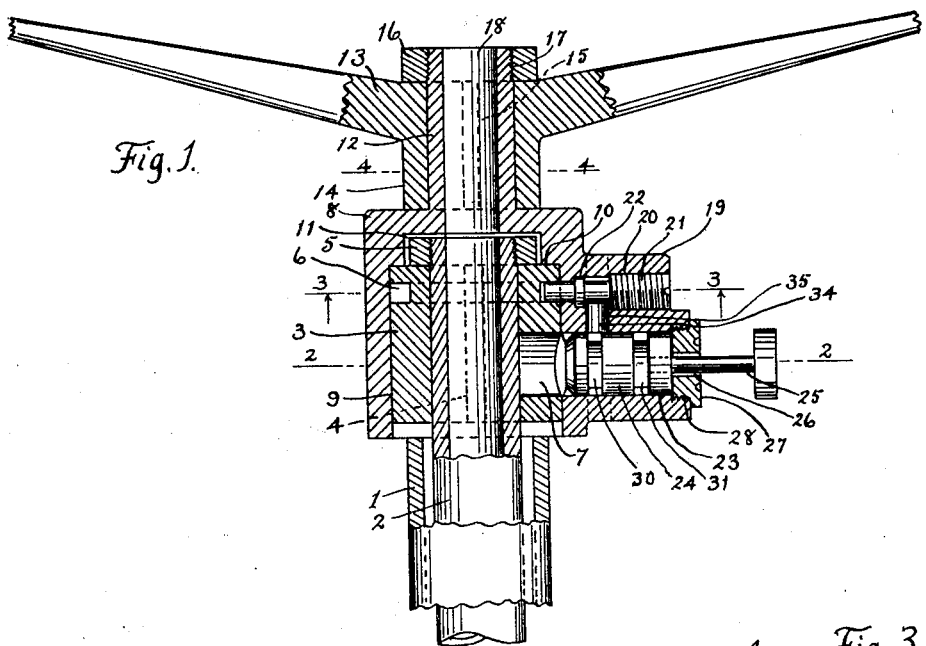
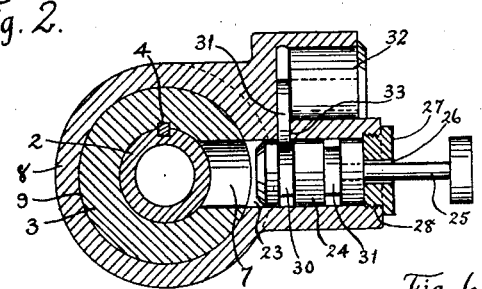
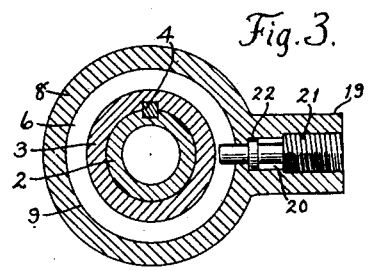
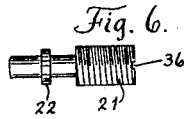
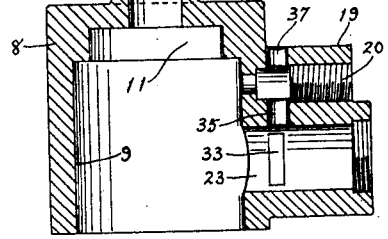
INVENTOR.
Louis C. Vanderlip.

UNITED STATES PATENT OFFICE.

LOUIS C. VANDERLIP, OF ELKHART, INDIANA.

VEHICLE STEERING MECHANISM.

1,396,078.  Specification of Letters Patent.  Patented Nov. 8, 1921.

Application filed May 24, 1920, Serial No. 383,715. Renewed April 21, 1921. Serial No. 463,357.

*To all whom it may concern:*

Be it known that I, LOUIS C. VANDERLIP, a citizen of the United States, residing in the city of Elkhart, county of Elkhart, Indiana, have invented certain new and useful Improvements in Vehicle Steering Mechanism, of which the following is a specification.

This invention relates to steering mechanism for vehicles, especially for motor vehicles.

The principal object of this invention is the provision of a device of the character described which, when applied to the steering gear of a motor vehicle, will enable the operator thereof to render the steering mechanism operative or inoperative at his own will to prevent the unauthorized use and operation of the vehicle.

Another object of the invention is the provision of a device of the character described which may be applied to existing motor vehicles of various types and to enable the use and application of the existing steering wheel to the invention. A third object of the invention is the production of a device of the character described in which the necessity for building a special steering wheel is eliminated and to which any standard make or type of steering wheel may be applied. A further object of the invention is the production of a device of the character described in which improved detent means is introduced to prevent the removal of the steering wheel hub or mount from the steering post when the steering mechanism is locked in an inoperative position. Other objects of my invention are mentioned and described herein.

The preferred embodiment of my invention is illustrated in the accompanying drawing, in which Figure 1 is a vertical sectional view showing my invention applied to the steering post of a motor vehicle; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a vertical sectional view through the wheel mount or carrier alone; and Fig. 6 is a view showing the wheel mount detent member. Similar numerals of reference indicate like members throughout the several views on the drawing.

Referring to the details of the drawing, the numeral 1 indicates the usual hollow steering column of a motor vehicle within which the usual or any operative type of steering post 2 is arranged, the latter being adapted for operative connection with the steering gear, as is well known in the art. The post 2 may be a hollow cylindrical member, as shown, to permit the usual spark and throttle control members to pass interiorly thereof, as is well known, or it may be otherwise formed for control members or devices arranged exteriorly of the steering column 1 and said post. The numeral 3 indicates a hollow cylindrical driver hub encompassing the upper end of the post 2 and which may be rigidly fastened thereto against rotation by a key 4, and against longitudinal displacement or movement by a nut 5 which may be screw threaded upon the top end of said steering post.

The driver hub 3 may be provided with the circumferential groove 6 and a radially formed bolt socket 7, the latter of which may be positioned in a plane different from that in which said groove is arranged. The numeral 8 indicates a steering wheel mount or carrier member which may have a cylindrical bore 9 adapted to revolubly encompass the driver hub 3, and which may be provided with the annular shouldered portion 10 to engage the top end of said driver hub to support the former thereon. The carrier 8 may have a chamber 11 formed therein to accommodate the nut 5, and it may be provided also with an upwardly projecting cylindrical stub shaft 12 which is disposed axially of the post 2 and which is preferably of less diameter than the mount body 8, said stub shaft being adapted to serve as a mount for a steering wheel 13 adapted to have its hollow hub 14 rigidly secured thereon by a key 15, or otherwise in any suitable manner. The wheel 13 may be any standard or special type of steering wheel to the hub bore of which the stub shaft 12 may be built to conform.

The numeral 16 indicates a nut which may be screw threaded upon the top end of the stub shaft 12 at 17 to prevent longitudinal displacement of the wheel 13. The stub shaft 12 may be longitudinally bored at 18 for registration with the interior of the hollow post 2 to enable the passage therethrough of the usual spark and throttle control members of a motor vehicle, as is well known in the art, and which are not shown on the drawing. When my invention is built for application to a steering mechanism in which the spark and throttle control devices are located exteriorly of the post 2, as they are at present in motor cars of the Ford and Dodge types, the stub shaft 12 may be made solid instead of being bored at 18.

The numeral 19 indicates a casing carried by the mount member 8 and provided with a radially disposed chamber 20 in which the detent pin 21 is removably arranged, the inner end of said pin engaging in the endless groove 6 of the hub member 3 and the outer end thereof being accessible from the exterior of the chamber 20 to enable removal thereof, said chamber being open at both ends. The pin 21 may be screw threaded into the chamber 20 to facilitate retraction thereof, but any other means of temporarily fastening it therein would serve the same purpose. The detent pin 21 may be provided with an annular shoulder or collar 22 positioned intermediate its extremities, the purpose and function whereof is hereinafter described.

The casing 19 may be provided also with a radially arranged bolt chamber 23, the inner end whereof is in communication with the carrier bore 9 and is disposed axially of the bolt socket 7 of the hub member 3, the outer end of said bolt chamber being open to permit the introduction of a locking bolt 24, cylindrically or otherwise formed, which bolt is adapted to be alternately moved into and out of engagement with the bolt socket 7 to effect a locked or unlocked relation or connection between the carrier member 8 and the driver hub 3. The bolt 24 may be manually actuated by a pin 25 suitably connected therewith, which pin may project to the exterior of the bolt chamber 23 through an opening 26 formed in the plug 27, the latter being screw threaded into the outer end of said bolt chamber at 28, which plug may serve as a stop member for said bolt when the latter is retracted from the socket 7. Numerals 29 and 30 indicate circumferential spaced grooves formed in the bolt 24, either of which grooves may be engaged by the point of the oscillatory arm 31 mounted on the key barrel of the tumbler lock 32, suitably mounted in the casing 19, said arm being adapted to swing through an opening 33 into chamber 23 for that purpose. When the bolt groove 29 is engaged by the arm 31 the bolt is releasably locked disengaged from the bolt socket 7 of the member 3, and when the groove 30 of said bolt is engaged by said arm, which is possible only when the bolt 24 is engaging the socket 7, said bolt is releasably locked in the driver hub socket 7.

It is important that the detent pin 21 be made readily detachable to authorized persons, and equally important that it be locked against unauthorized persons. For this purpose, a stop or locking stud 34 is loosely arranged in the chamber 35 connecting the chambers 20 and 23, the upper end of said stud projecting into the chamber 20 into the path of retractive movement of the pin 21, the lower end of said stud resting upon the bolt 24 after the latter has been inserted into its chamber. Obviously, when an attempt is made to unscrew or remove the detent pin 21 the collar 22 of said pin engages the stud 34 and further movement thereof is impossible until said stud is removed. The bolt 24 is adapted to support the stud 34, whether engaged with or disengaged from the bolt socket 7, so long as it remains in its normal position in its chamber. Obviously, unscrewing the plug 27 enables ready removal of the bolt 24 from its chamber, thereby enabling removal of the stud 34 and the detent pin 21, but the removal of the bolt 24 contemplates the ability to control and operate the lock 32 which requires a key.

The detent pin may be provided with a screw driver slot 36 to enable actuation thereof into or out of its chamber. In Fig. 5 is shown a simple, cheap method of forming the stud chamber 35 and it consists in drilling through the casing 19 at 37, the drill passing thence through the pin chamber 20 to form the chamber 35. In assembling the stud 34 in its chamber 35 it may be dipped in some viscous material, vaseline for example, to retain it therein until the bolt 24 can be introduced into its chamber.

As stated, one of the objects of this invention is to provide a device to enable the use of the old or existing steering wheel of a motor vehicle in combination with a locking means. It will be at once appreciated by a person skilled in this art that the stub shaft 12 may be eliminated altogether and the spider arms of a steering wheel cast integral with the member 8, or attached thereto, to produce a special steering wheel, the hub whereof (member 8 in this case) would be identical with the wheel carrier 8 of this invention. I intend, therefore, that all descriptive matter herein contained or shown in the accompanying drawing and relating to the detention means for preventing endwise movement of the member 8, shall be interpreted as illustrative and not in a limiting sense.

I claim:

1. In a device of the class described, in combination, a steering post; a driver hub thereon; a steering element carrier rotatably encompassing said driver hub; means for releasably locking said steering element carrier to said hub; disengageable detention means to prevent endwise movement of said carrier relative to said post; releasable means to prevent disengagement of said detention means; and lock controlled means to enable access to said last mentioned means to effect release thereof from said detention means.

2. In a device of the class described, in combination, a steering post; a driver hub rigidly secured to said post; a steering member mounted upon said hub; means carried by said steering member adapted for alternate engagement with and disengagement from said hub member, whereby said steering member is operatively connected with said hub member or rendered independently rotatable thereon; radially arranged disengageable detention means to prevent endwise movement of said steering member relative to said steering post, said means comprising a tongue and groove connection between said driver hub and said steering member; releasable means to prevent disengagement of said detention means; and lock controlled means to enable access to said last mentioned means for effecting release thereof from said detention means.

3. In a device of the class described, in combination, a steering post; a driver hub rigidly secured to said post; said hub being provided with a socket; a steering member mounted upon said hub; a movable locking member mounted in said steering member and adapted for alternate engagement with and disengagement from said hub socket, whereby said steering member is operatively connected with said hub or rendered independently rotatable thereon; disengageable detention means to prevent endwise movement of said steering member relative to said post; releasable means to prevent disengagement of said detention means; and means for effecting an additional movement of said locking member to enable access to said last mentioned means for effecting release thereof from said detention means.

4. In a device of the class described, in combination, a steering post; a driver hub rigidly secured to said post; a steering member mounted upon said hub; means carried by said steering member adapted for alternate engagement with and disengagement from said hub member, whereby said steering member is operatively connected with said hub member or rendered independently rotatable thereon; disengageable detention means carried by said steering member to prevent endwise movement of said steering member relative to said post, said means comprising a tongue and groove connection between said driver hub and said steering member; releasable means to prevent disengagement of said detention means; and means to enable access to said last mentioned means for effecting release thereof from said detention means.

5. In a device of the class described, in combination, a steering post; a driver hub rigidly secured to said post; a steering member mounted upon said hub; means carried by said steering member adapted for alternate engagement with and disengagement from said hub member, whereby said steering member is operatively connected with said hub member or rendered independently rotatable thereon; a movable detent member carried by said steering member and engaging said hub member; movable means engaging said detent member intermediate its extremities to prevent disengagement thereof from said hub member; and lock controlled means to enable access to said last mentioned means for effecting disengagement thereof from said detent member to enable disengagement of the latter from said hub member.

6. In a device of the class described, in combination, a steering post; a driver hub rigidly secured to said post, said hub being provided with a socket; a steering member mounted upon said hub and provided with a chamber; a movable locking member mounted in said steering member chamber and adapted for alternate engagement with and disengagement from said driver hub socket, whereby said steering member is operatively connected with said hub or rendered independently rotatable thereon, said locking member being removable from said chamber; disengageable detention means to prevent endwise movement of said steering member relative to said post; and means accessible from the interior of said locking member chamber, after removal of said locking member therefrom, to enable disengagement of said detention means, whereby said steering member may be removed from said driver hub.

7. In a device of the class described, in combination, a steering post; a driver hub rigidly secured to said post; a carrier member mounted upon said hub; means carried by said carrier member adapted for alternate engagement with and disengagement from said driver hub, whereby said carrier member is operatively connected with said hub or rendered independently rotatable thereon; a steering wheel or member removably mounted upon said carrier member; disengageable detention means to prevent endwise movement of said carrier member relative to said post; releasable means to prevent disengagement of said detention means; and lock controlled means to enable access to said last mentioned means for effecting release thereof from said detention means.

8. In a device of the class described, in combination, a steering post; a driver hub rigidly secured to said post, said hub being provided with a socket; a steering member mounted upon said hub; means carried by said steering member adapted for alternate engagement with and disengagement from said hub socket, whereby said steering member is operatively connected with said hub or rendered independently rotatable thereon, said means being removably disposed within a chamber carried by said steering member; disengageable detention means to prevent endwise movement of said steering member relative to said post, said means comprising a complementary tongue and groove connection between said driver hub and said steering member; and means accessible from the interior of said chamber in which said first mentioned means is arranged, after the removal of the latter therefrom, to enable disengagement of said detention means, whereby said steering member may be removed from said driver hub.

9. In a device of the class described, in combination, a steering post; a driver hub rigidly secured to said post; a carrier member rotatably encompassing said hub; a stub shaft projecting from said carrier member and adapted to have a steering wheel or member mounted thereon; means mounted on said carrier member adapted for alternate engagement with and disengagement from said driver hub, whereby said carrier member is operatively connected with said hub or rendered independently rotatable thereon; disengageable detention means to prevent endwise movement of said carrier member relative to said post; releasable means to prevent disengagement of said detention means; and lock controlled means to enable access to said last mentioned means for effecting release thereof from said detention means.

10. In a device of the class described, in combination, a hollow steering post; a driver hub rigidly secured to said post; a carrier member rotatably encompassing said hub; a hollow stub shaft projecting from said carrier member, the bore of said stub shaft being in communication with the bore of said hollow steering post, said stub shaft being adapted to have a steering wheel or member mounted thereon; means mounted on said carrier member adapted for alternate engagement with and disengagement from said driver hub, whereby said carrier member is operatively connected with said hub or rendered independently rotatable thereon; disengageable detention means to prevent endwise movement of said carrier member relative to said post; releasable means to prevent disengagement of said detention means; and lock controlled means to enable access to said last mentioned means for effecting release thereof from said detention means.

In testimony whereof I have hereunto affixed my signature this 22d day of May, 1920.

LOUIS C. VANDERLIP.